June 9, 1931.   S. PLUMLEY   1,808,967
CUTTING TORCH
Filed June 27, 1929
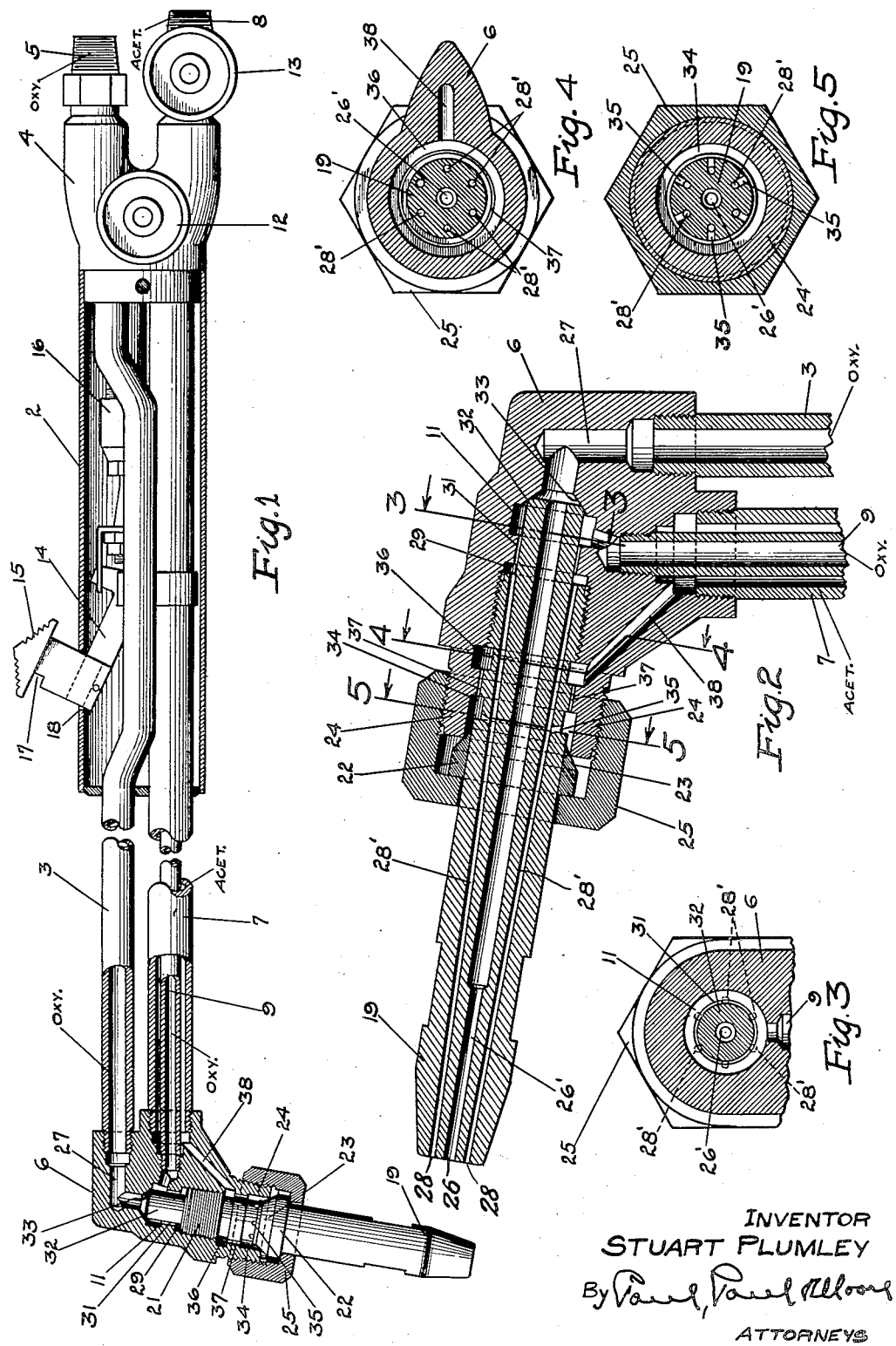
INVENTOR
STUART PLUMLEY
ATTORNEYS Patented June 9, 1931

1,808,967

UNITED STATES PATENT OFFICE

STUART PLUMLEY, OF MINNEAPOLIS, MINNESOTA, ASSIGNOR TO SMITH WELDING EQUIPMENT CORPORATION, OF MINNEAPOLIS, MINNESOTA, A CORPORATION OF MINNESOTA

CUTTING TORCH

Application filed June 27, 1929. Serial No. 374,074.

This invention relates to new and useful improvements in cutting torches, generally, and more particularly to such a torch having a central orifice adapted to deliver a cutting fluid, such as oxygen, and having a plurality of relatively small preheating orifices arranged around said cutting orifice.

In torches of this character, the effective preheating flame, projected from the end of the torch tip, is composed of a plurality of small flames projected from the preheating orifices. To provide an efficient preheating flame, the flames simultaneously projected from the preheating orifices should be substantially uniform in length, otherwise the resultant preheating flame will not be even and uniform. The construction of ordinary cutting torches is such that the distribution of the oxygen and acetylene to the various preheating orifices is not equal, and consequently the plurality of independent flames projected from the torch tip, and which cooperate to produce the preheating flame, are not uniform in length, thereby lowering the efficiency of the preheating flame. Such irregular distribution of the fuel gases to the preheating orifices usually results because of the fact that both the oxygen and acetylene gases are usually delivered, from suitable conduits, to independent annular chambers, each of which communicates directly with the preheating orifices. By thus supplying the preheating orifices with the fuel gases, directly from these annular chambers, those orifices connected with the annular chambers nearest to the supply conduits, will receive more oxygen and acetylene than those located farther away from the supply conduits, resulting in the jets projected from the preheating orifices on one side of the torch tip being longer than those on the other side of the tip.

It is an object of the present invention to provide means in the torch head which will cause the fuel gases to be uniformly and evenly distributed to the intake ends of the fuel passages leading to the preheating orifices, whereby the plurality of independent flames or jets projected from the preheating orifices, will be even in length so that the resultant flame projected from the torch tip will be even and uniform.

A further and more specific object of the invention is to provide an annular chamber within the torch head communicating with the preheating orifices in the torch tip, and also communicating with an annular cavity through a comparatively narrow annular fuel passage completely encircling the torch tip, whereby the gases delivered to the annular cavity by means of a duct connecting it with a source of fuel supply, must pass through this narrow annular passage, thereby causing the delivery of gas to the annular chamber to be uniformly distributed around the torch tip, resulting in the supply of gas to the preheating orifices being uniform, whereby the small jets or flames projected from the preheating orifices, will be of substantially uniform length, thereby causing the resultant preheating flame projected from the torch tip to be uniform.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a longitudinal sectional view showing a conventional form of cutting torch with the invention applied thereto;

Figure 2 is an enlarged detail sectional view showing the construction of the torch head;

Figure 3 is a detail sectional view on the line 3—3 of Figure 2;

Figure 4 is a detail sectional view on the line 4—4 of Figure 2; and

Figure 5 is a detail sectional view on the line 5—5 of Figure 2.

In the selected embodiment of the invention here shown, there is illustrated in Figure 1, a cutting torch comprising a handle portion 2 having a conduit 3 therein, one end of which is connected to a fitting 4, provided with a threaded extension 5, whereby the conduit 3 may be connected to a suitable supply of oxygen. The opposite end of the conduit 3 is connected to the usual torch head 6. A relatively larger conduit 7 also has one end connected to the torch head 6 and its opposite end to the fitting 4 and communicates with a threaded extension 8, adapted to be connected to a source of acetylene gas, not shown. A small tube 9 is shown mounted within the conduit 7 and has one end communicating with an annular cavity 11, provided in the head 6, and its opposite end adapted to be connected with the threaded extension 5 by means of a valve 12. A valve 13 controls the supply of acetylene to the conduit 7. The valves 12 and 13 are of ordinary construction, and it is therefore thought unnecessary to show same in detail.

A lever 14, having a finger grip 15, is mounted in the handle portion 2 and is adapted to open and close a valve 16, partially shown in Figure 1. This valve controls the flow of oxygen through the conduit 3. The finger grip 15 is mounted for sliding movement on the lever 14 and is shown provided with a notch 17, adapted to be engaged with the edge 18 of a slot provided in the handle portion 2 so as to lock the lever in depressed position. The lever is normally retained in the position shown in Figure 1 by means of a spring, not shown. This spring normally holds the valve 16 in closed position. When it is desired to project a cutting flame from the torch tip 19, the lever 14 is depressed and the finger grip moved forwardly until the notch 17 engages the edge 18, thereby retaining the lever in valve opening position.

The torch tip 19 is provided with a threaded portion 21 adapted to be received in a threaded socket provided in the torch head 6. The tip is also provided with an annular packing gland 22 having a frusto-conical face 23 adapted to be seated against the inner corner of the threaded end portion 24 of the torch head, as shown in Figures 1 and 2, to provide a leak-proof connection between the tip and the torch head. A nut 25 locks the tip to the torch head.

The torch tip is shown provided with a central passage 26' provided with a cutting orifice 26. A duct 27 connects the passage 26' with the conduit 3. The tip is also provided with a plurality of preheating orifices 28, encircling the central cutting orifice 26 and having passages 28' connecting them with an annular chamber 29 which communicates with the annular cavity 11 by means of a narrow annular passage 31 encircling the reduced cylindrical portion 32 of the torch tip. The inner end of the cylindrical portion 32 of the torch tip is seated against a frusto-conical seat 33 to prevent leakage of oxygen from the conduit 3 to the annular cavity 11. It is to be understood that the packing gland 22 is mounted for relative movement upon the torch tip so that when the tip is secured to the torch head, with its inner end seated against the frusto-conical seat 33, and the nut 25 is secured to the threaded end 24 of the head, the gland 22 will be tightly seated against the end of the torch head, as best shown in Figure 2.

The end of the torch head is counterbored to provide an annular chamber 34 communicating with the passages 28' by means of a series of small ducts 35 shown in Figures 2 and 5. The chamber 34 communicates with an annular cavity 36 by means of a narrow fuel passage 37, encircling the torch tip. A duct 38 connects the groove 36 with the conduit 7.

In the operation of this novel cutting torch, the extension 5 is connected with a suitable source of oxygen and the extension 8 with a source of acetylene, preferably by means of flexible hose, not shown. Before the cutting operation is started, the work is preheated. This is accomplished by opening the valves 12 and 13, whereby a supply of oxygen and acetylene will be delivered to the preheating orifices 28. The acetylene flowing thru the conduit 7 will pass through the duct 38 into the annular cavity 36, from whence it will flow through the annular narrow fuel passage 37 into the chamber 34, thence thru the radial ducts 35 and into the passages 28', through which it will flow to the preheating orifices 28. Because of the narrow fuel passage 37 provided between the cavity 36 and chamber 34, the acetylene will be delivered to the chamber 34 in a uniform flow encircling the torch tip, thereby causing the delivery of acetylene from the chamber 34 to each passage 28' to be substantially uniform. In like manner, the flow of oxygen from the tube 9 into the annular cavity 11 will be delivered to the annular chamber 29 thru the narrow annular passage 31 so that the delivery of oxygen to the receiving ends of the passages 28' will be uniform, thereby causing the individual jets of flame discharging from the orifices 28 to be substantially uniform in length and size, whereby the resultant preheating flame projected from the orifices 28 will be substantially uniform.

As soon as the work has been preheated to the desired temperature, the valve 16 is opened by depression of the finger grip 15, thereby causing the oxygen or cutting fluid to be delivered to the central passage 26' through which it will flow to the cutting orifice 26 of the torch tip from the conduit 3.

From the foregoing, it will be seen that the provision of the annular passage 31 provided between the chamber 29 and groove 11, and the annular gap 37 provided between the chamber 34 and cavity 36, constitute an important feature of this invention, in that the delivery of the fuel gases to the passages 28' will be uniform, thereby resulting in the flames projected from the preheating orifices 28 being of uniform length.

I claim as my invention:

1. In a torch, the combination of a head provided with a tip having a plurality of preheating orifices, means for supplying a fuel gas to said orifices, said head having a cavity therein connected with said fuel supply means and also having a chamber therein communicating with said orifices, said head also having a narrow annular fuel passage connecting said cavity with said chamber, whereby the fluid pressure in said chamber will be uniform, causing equal distribution of fuel gases to said orifices.

2. In a torch, the combination of a head provided with a tip having a plurality of preheating orifices, conduits for supplying acetylene and oxygen to said orifices, said head having annular cavities therein, one connected with the acetylene supply conduit and the other with the oxygen supply conduit, and each cavity having a narrow annular passage connecting it with said orifices, said annular passages causing the fluid pressures in their respective cavities to become equalized whereby the distribution of acetylene and oxygen to said orifices will be equalized, causing the preheating flame projected from the end of the torch tip to be uniform.

3. In a torch, the combination of a head provided with a tip having a plurality of preheating orifices provided with passages extending lengthwise therethrough, conduits for supplying acetylene and oxygen to said passages, said head having annular cavities therein, one of which communicates with the acetylene supply conduit and the other with the oxygen supply conduit, said head also being provided with annular chambers which communicate directly with the passages leading to said orifices, one of said chambers having a narrow annular fuel passage connecting it with the cavity connected with said acetylene supply conduit, and the other of said chambers having an annular narrow passage connecting it with the cavity connected with the oxygen supply conduit, said narrow annular passages causing the delivery of acetylene and oxygen to said preheating orifices to be equally distributed among said orifices, whereby the preheating flames projected therefrom will be of uniform size and length.

4. In a torch, the combination of a head provided with a tip having a central cutting orifice and a plurality of preheating orifices disposed around said cutting orifice, means for supplying a cutting fluid to said cutting orifice, conduits for supplying acetylene and oxygen to said preheating orifices, said head having annular cavities therein, one of which communicates directly with the acetylene supply conduit and the other with the oxygen supply conduit, said head also having annular chambers therein arranged to encircle said tip and directly communicating with said preheating orifices, one of said chambers having an annular narrow fuel passage connecting it with the cavity connected with said acetylene supply conduit and the other of said chambers having an annular narrow passage connecting it with the cavity connected with the oxygen supply conduit, said annular narrow passages causing the flow of gases from said cavities to their respective chambers, to be equally distributed around the tip body, whereby each of said preheating orifices will receive an equal supply of fuel gas.

In witness whereof, I have hereunto set my hand this 19th day of June, 1929.

STUART PLUMLEY.